(12) United States Patent
Bossler et al.

(10) Patent No.: US 6,482,321 B1
(45) Date of Patent: Nov. 19, 2002

(54) WEIGHTED SUCTION FILTER FOR A FUEL HOSE

(75) Inventors: Hans Bossler, Backnang (DE); Roland Adam, Besigheim (DE); Ralf Tuckermann, Stuttgart (DE)

(73) Assignee: Andreas Stihl AG & Co. (DE)

( * ) Notice: Subject to any disclaimer, the term of this patent is extended or adjusted under 35 U.S.C. 154(b) by 0 days.

(21) Appl. No.: 09/713,991

(22) Filed: Nov. 10, 2000

(30) Foreign Application Priority Data

Nov. 10, 1999 (DE) .......................................... 199 53 986

(51) Int. Cl.[7] .............................................. B01D 35/02
(52) U.S. Cl. ....................... 210/315; 210/172; 210/316; 210/463; 210/485; 210/489; 210/497.01; 210/499
(58) Field of Search ................................ 210/172, 315, 210/316, 459–463, 416.4, 484, 485, 489, 497.01, 499, 510.1

(56) References Cited

U.S. PATENT DOCUMENTS

| | | | |
|---|---|---|---|
| 2,810,482 A | * 10/1957 | Kasten | ....................... 210/460 |
| 3,826,372 A | 7/1974 | Bell | |
| 4,411,788 A | 10/1983 | Kimura | |
| 4,428,835 A | * 1/1984 | Nagashima | .................. 210/172 |
| 4,618,422 A | * 10/1986 | Sasaki et al. | ................ 210/172 |
| 4,645,600 A | * 2/1987 | Filippi | ...................... 210/416.4 |
| 4,717,477 A | * 1/1988 | Nagashima | .................. 210/314 |
| 4,851,118 A | 7/1989 | Kurihara | |
| 5,441,637 A | 8/1995 | Gutjahr et al. | |

* cited by examiner

*Primary Examiner*—Matthew O. Savage
(74) *Attorney, Agent, or Firm*—R W Becker & Associates; R W Becker

(57) ABSTRACT

A suction head is provided for the end of a fuel hose in a fuel tank of a portable implement. The suction head comprises a cup-shaped housing of polymeric material that is closed off by a cap. Provided on the cap is a connector for the end of the fuel hose. The outer surface of the housing is provided with window-like cutouts that are covered by a filter mesh. In order also with narrow, fragmented tank housings to ensure an immersion of the suction head into the fuel in every operating position, a rod-shaped weight member is disposed in the center of the housing. This weight member extends from the base of the housing to the cap, with a first end of the weight member being held on the base and a second end being held on the cap.

19 Claims, 3 Drawing Sheets

WEIGHTED SUCTION FILTER FOR A FUEL HOSE

BACKGROUND OF THE INVENTION

The present invention relates to a suction head for the end of a flexible fuel line in a fuel tank, especially in a fuel tank of a portable, manually-guided implement such as a power chainsaw, a hedge clipper, a brush cutter, a cut-off machine, or the like.

A suction head of this general type is known from U.S. Pat. No. 5,441,637. The suction head is connected to the free end of a fuel hose that is disposed in a fuel tank, and ensures filtration of the fuel prior to entry thereof into the fuel hose. In order in every position of the fuel tank to ensure that the suction head is immersed in the fuel, an appropriate flexibility of the fuel line is required; since the suction head furthermore has a certain weight due to its construction, in most cases displacement of the suction head under the force of gravity is sufficient.

Due to the limited space conditions in modern, portable implements such as chainsaws, hedge clippers, cut-off machines, brush cutters or the like, the fuel tank is shaped to conform to the requirements of the outer housing, and is often fragmented. Such configurations of a fuel tank can, under unfavorable operating positions, lead to disruptions in the fuel supply if the suction head is not immersed deeply enough in the fuel.

It is therefore an object of the present invention to provide a suction head for a flexible fuel line where in every operating position of the fuel tank the suction head is disposed in the fuel.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
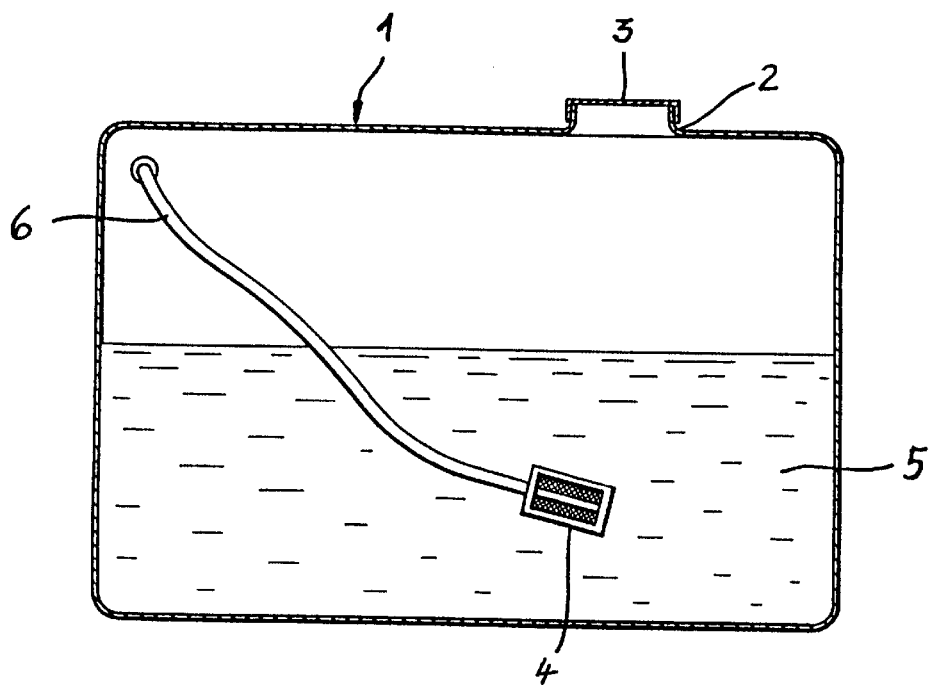
FIG. 1 is a cross-sectional view through a fuel tank.

The suction head of the present invention comprises a cup-shaped housing of polymeric material that is closed off by a cap having a connector for the end of a flexible fuel line; the outer surface of the housing is provided with window-like cutouts that are covered by a filter mesh; disposed in the center of the housing is a rod-shaped weight member that extends essentially over the length of the housing from the base thereof to the cap, wherein a first end of the weight member is held on the base of the housing and a second end is held on the cap.

The rod-like weight member that is disposed in the center of the housing ensures that in every operating position the suction head will sink under the force of gravity to the deepest location of the tank, so that even with fragmented tanks a complete utilization of the fuel is provided accompanied by a high functional reliability.

Since a rod-shaped weight member is exposed to the not inconsiderable vibrations of the implements, which are generally driven by two-stroke engines, in order to provide a permanent holding of the weight member in the suction head the first end of the weight member is fixed in position on the base and the second, free end is fixed in position on the cap.

Expediently, the first end of the weight member, which faces the base of the housing, is provided with a plate-shaped base that is fixed in position on the base of the housing. The base of the weight member is advantageously embedded in the polymeric material of the base of the housing, as a result of which the base member is positively held at least axially, and expediently also radially.

At that end that faces the cap, the weight member is axially inserted and held in a receiving means of the cap, so that a complete radial support is provided. In so doing, the inside diameter of the receiving means is slightly less than the diameter of the facing end of the weight member, so that a holding that is free of play is provided and to a great extent every relative movement between the cap and the weight member is eliminated. The receiving means comprises a plurality of axially extending flanges that are disposed on the cap and that in the circumferential direction are spaced from one another and due to their axial length are slightly elastically deformable. Thus, with low tolerances the receipt of the end of the weight member in the receiving means in a manner free of play can be ensured. Due to the limited insertion depth of the weight member, discharge windows are formed between the flanges via which the fuel passes into the connector.

It is advantageous from a production standpoint to make the one-piece cap with the connector and the axially extending flanges of the receiving means out of polymeric material.

Pursuant to a further specific embodiment of the present invention, the outer contour of the base of the housing is spherical or rounded, so that the suction head tends to tilt and therefore appropriately tilts even with small changes in position of the fuel level. Since the weight member is anchored in the base of the housing with only a plate-like base, the thickness of the base of the housing can be small, so that even when the suction head stands upright, it is possible to convey the fuel up to a minium fuel level. For a complete utilization of the volume of the fuel tank, it can be expedient to provide additional or supplemental inlet openings in the base of the housing; these inlet openings expediently open out between the insert and the filter mesh.

Further specific features of the present invention will be described in detail subsequently.

DESCRIPTION OF PREFERRED EMBODIMENTS

Referring now to the drawings in detail, FIG. 1 shows a fuel tank 1 that is provided with a filler connection 2 having a tank lid 3. Guided into the fuel tank 1 is a flexible fuel line 6, especially a flexible fuel hose, to the free end of which is connected a suction head 4. The suction head 4, which is suspended on the fuel hose, is submerged in the fuel 5, for which purpose the suction head 4 is provided with a weight, as will be described in detail subsequently.

Figure 3:
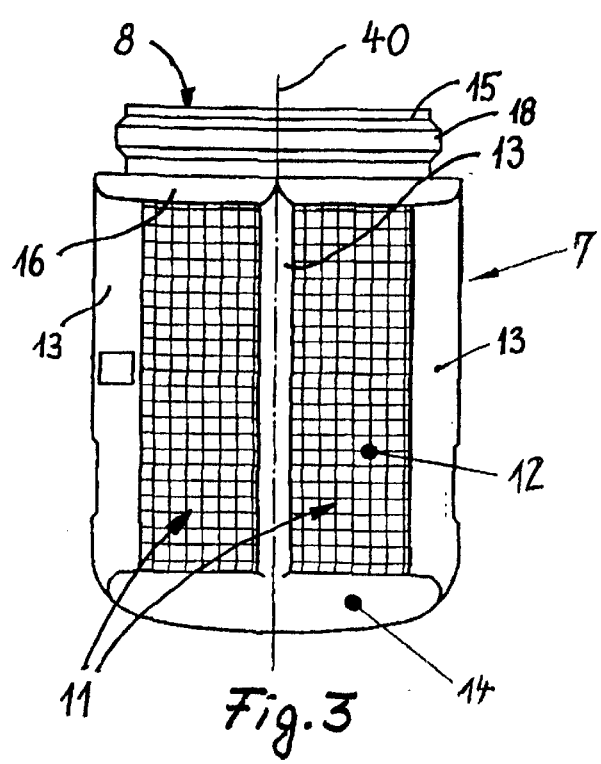
FIG. 3 shows the housing of the suction head.
Figure 2:
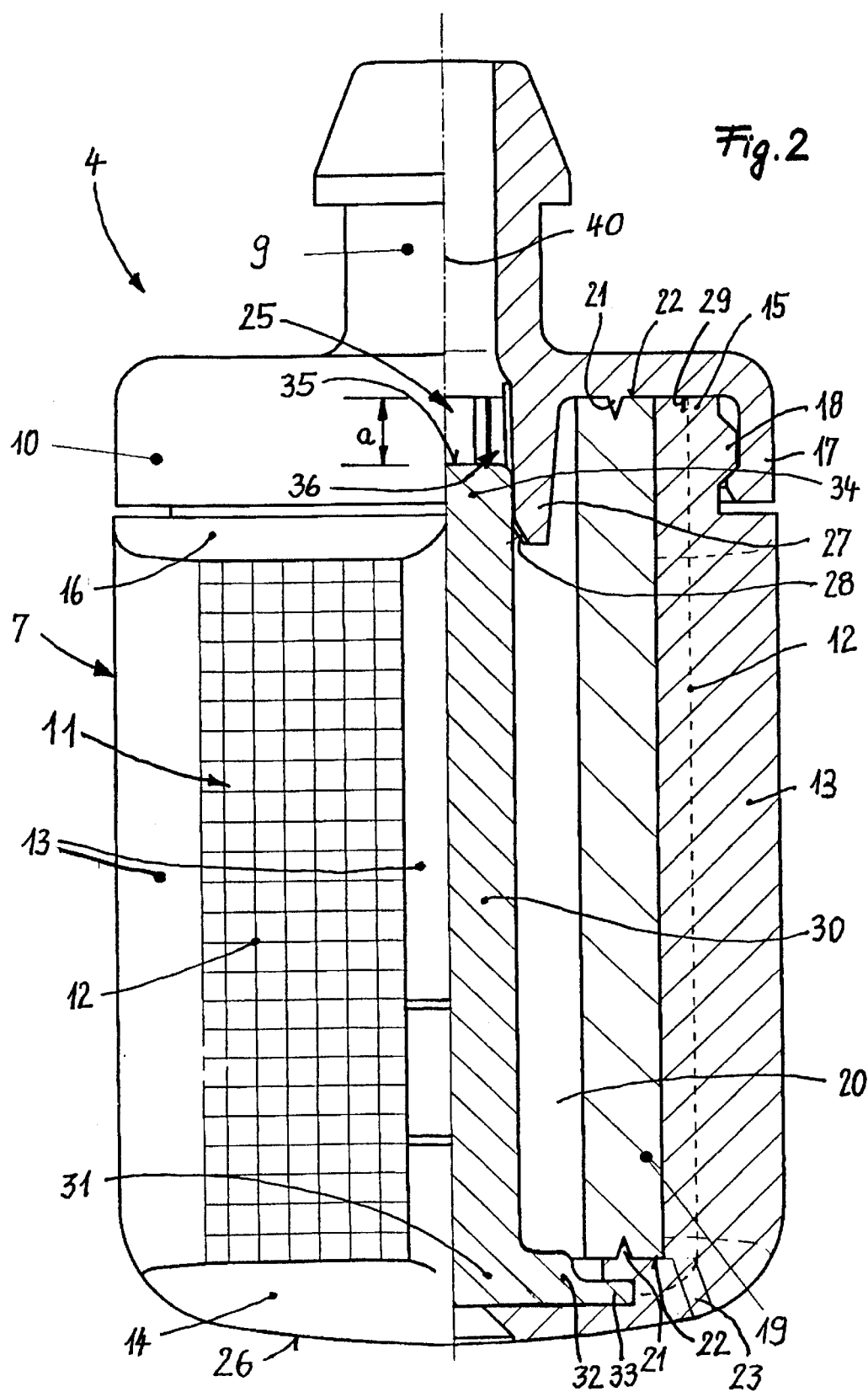
FIG. 2 is a partially cross-sectioned enlarged view of one exemplary embodiment of an inventive suction head.

FIGS. 2 and 3 show enlarged views of the suction head 4. The suction head 4 essentially comprises a cup-shaped main housing 7 having a longitudinal central axis 40; the open end 8 of the housing 7 (see FIG. 3) is closed off by a cap 10.

Formed on the cap 10, preferably coaxial to the longitudinal central axis 40, is a connector 9 for the end of the flexible fuel line 6. Both the housing 7 as well as the cap 10 are advantageously made of polymeric material, preferably polyamide.

The outer surface of the housing 7 is provided with window-like cutouts 11 that are covered by a filter mesh 12. Distributed over the periphery are four adjacent cutouts 11 having a circumferential angle of about 85°. The cutouts 11 essentially extend over the length of the housing 7. Remaining between the cutouts 11 are housing strips 13 that extend from the base 14 at the closed end of the housing 7 to an annular collar 16 at the open end 8 of the housing 7. Provided above the collar 16 is a rim 15 over which the cap 10 extends. In so doing, the cap rim 17 catches on a correspondingly shaped, annular arresting bead 18 of the rim 15, thereby closing off the housing 7 in a substantially fuel-tight manner. Thus, entry of the fuel into the suction head 4 is effected via the cutouts 11 and the filter mesh 12.

As can be seen from FIG. 2, a preferably cylindrical insert 19 is mounted in the housing 7, whereby the hose connector 9 communicates with the interior 20 of the insert. The outer diameter of the insert 19 is such that radially a spacing exists relative to the filter mesh 12. It can be expedient to form the housing strips 13 in such a way that they rest upon the outer surface of the cylindrical insert 19 and thus center the insert in the housing 7.

The insert 19 serves as an air eliminator and comprises sintered polyethylene having a grain size of 80 μm or less. The length of the insert 19 corresponds approximately to the axial inner distance between the base 14 and the cap 10, whereby across from the end faces 22 of the insert 19, there are provided on the base 14 as well as on the cap 10 axially extending, annular projections 21 that dig into the end faces 22 and hence securely hold the insert 19 in the housing 7 in a non-displaceable manner.

Disposed in the center of the housing 7 is a bar- or rod-shaped weight member 30 that extends essentially over the length of the housing 7 from the base 14 thereof to a receiving means 25 of the cap 10. The length of the weight member 30 is such that a gap "a" remains relative to the base 29 of the cap. The interior 20 of the insert 19 is transformed into an annular chamber by the pole-shaped weight member 30. The first end 31 of the rod-shaped, preferably bolt-shaped, cylindrical weight member 30, which end 31 faces the base 14 of the housing 7, is fixedly held on the base 14. For this purpose, the weight member 30 has a plate-shaped base 32 that is fixed in position on the base 14. The reduced thickness rim 33 of the plate-shaped base 32 is preferably embedded in the polymeric material of the base 14, as a result of which the base 32 is positively held in the base not only axially but also radially.

Supplemental inlet openings 23 can be provided in the base 14 of the housing 7; these openings 23 are expediently also covered by filter mesh and open out into the filter space between the filter mesh 12 and the insert 19. To ensure a filtering of the inflowing fuel, the filter mesh 12 is extended into the base 14 and covers the supplemental inlet openings 23. As shown in FIG. 2, the outer contour 26 of the base 14 is spherical or rounded to ensure that the suction head 4 can incline in conformity with the position of the fuel tank 1 or in conformity with the fuel level.

The rod-shaped or bolt-shaped weight member 30 is coaxially disposed in the housing 7; in conformity therewith, the tubular insert 19 is disposed coaxially to the weight member 30.

The second end 34 of the weight member 30 that faces the cap 10 is held on the cap. For this purpose, the cap is provided with a receiving means 25 that is associated with the weight member 30 and in which the weight member, i.e. its free end 34, is axially inserted and held.

Figure 5:
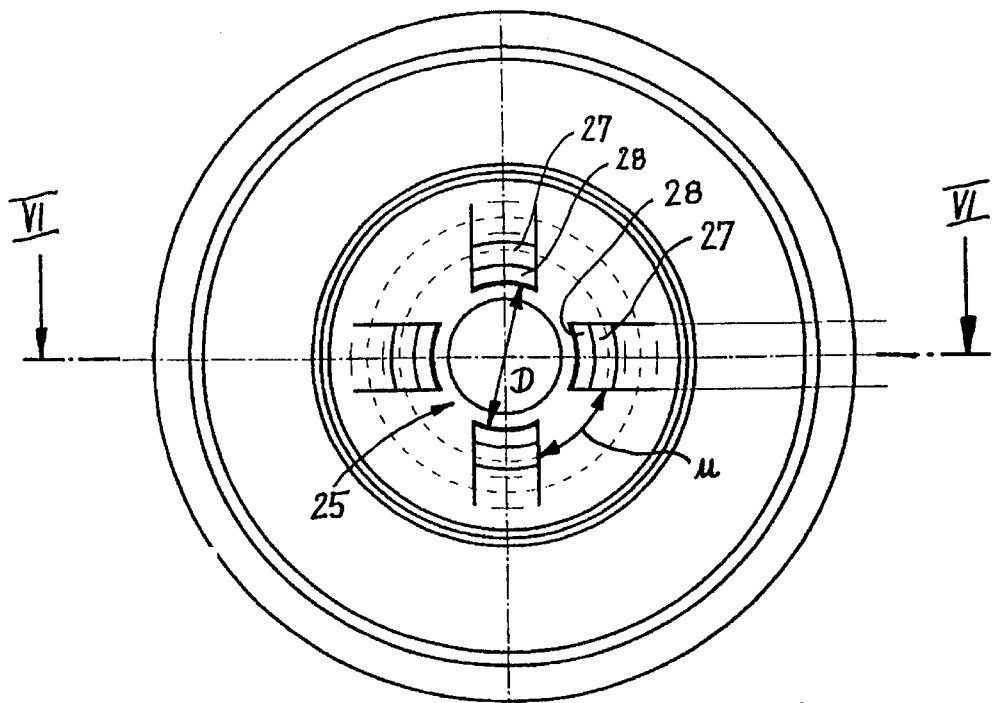
FIG. 5 is a plan view of that inner side of a cap of the housing that faces the housing.
Figure 6:
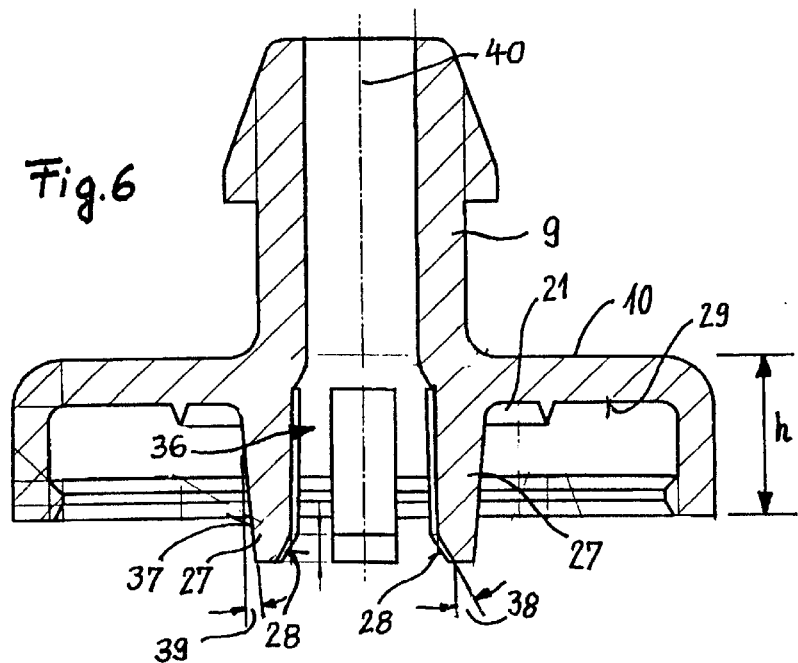
FIG. 6 is a cross-sectional view through the cap of the suction head taken along the line VI—VI in FIG. 5.

As shown in FIGS. 5 and 6, when the cap 10 is viewed in plan the receiving means 25 is aligned with the connector 9, i.e. is coaxial with the longitudinal central axis 40. The receiving means 25 is formed of flanges 27 that project axially into the housing 7 and which, as shown in FIG. 5, are spaced from one another in the circumferential direction by the distance "u". The flanges 27 have an axial extension that is greater than the height "h" of the cap 10, which is expedient with respect to the assembly and the introduction of the free end 34 of the weight member 30 into the receiving means 25. To facilitate introduction, the ends of the holding flanges 27, on the facing sides 28, are beveled at an angle 38, as a consequence of which the receiving means 25 conically widens toward the interior of the housing 7. The holding flanges 27 are also tapered over their length, for which purpose the outer surfaces 37 of the flanges are disposed at an angle 39 relative to the longitudinal central axis 40 of the housing 7.

Figure 4:
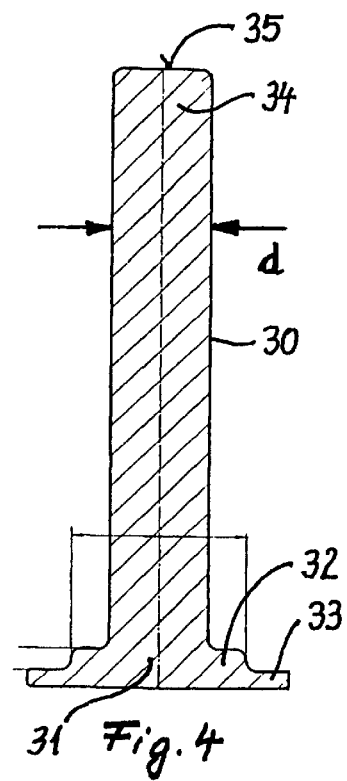
FIG. 4 is a cross-sectional view through a weight member of the suction head.

The inside diameter D of the receiving means 25 (see FIG. 5) is slightly less than the diameter "d" of the facing end 34 of the weight member 30 (see FIG. 4). In this way, a holding of the weight member in the receiving means 25 that is free of play is achieved; this leads to a permanent, reliable holding of the weight member 30 in the suction head 4, especially with regard to the strong vibrations that occur in portable implements. As can be seen from FIG. 2, due to the length selected for the weight member 30, the end 34 thereof has a structurally limited insertion depth into the receiving means 25. A gap "a" remains between the base 29 of the cap 10 and the end face 35 of the end 34, as a result of which discharge windows 36 remain open between the holding flanges 27; these discharge windows 36 open directly into the connector 9. The fuel that is filtered by the filter mesh 12 and flows through the insert 19 is discharged through the windows 36 into the fuel line 6 to the carburetor of the associated internal combustion engine.

The specification incorporates by reference the disclosure of German priority document 199 53 986.3 of Nov. 10, 1999.

The present invention is, of course, in no way restricted to the specific disclosure of the specification and drawings, but also encompasses any modifications within the scope of the appended claims.

What we claim is:

1. A suction head for the end of a flexible fuel line (6) in a fuel tank (1) of a portable, manually-guided implement, comprising:

a cup-shaped housing (7) of polymeric material, wherein an outer surface of said housing is provided with cutouts (11);

a filter mesh (12) for covering said cutouts (11);

a cap (10) for closing off said housing (7), wherein said cap is provided with a connector (9) that communicates with an interior of said cap (10) and serves for connection to an end of a fuel line (6); and a rod-shaped weight member (30) disposed in said interior of said housing (7), wherein said weight member essentially extends over the length of said housing (7) from a base (14) thereof to said cap (10), wherein a first end (31) of said weight member (30), which first end faces said base (14) of said housing (7), is provided with a plate-shaped base (32) that is disposed against said base (14) of said housing (7), wherein said base (32) of said weight member (30) is embedded in polymeric material of said base (14) of said housing (7), and wherein a second end (34) of said weight member (30) is disposed against said cap (10).

2. A suction head according to claim 1, wherein said cap (10) is provided with a receiving means (25), and wherein said second end (34) of said weight member (30), which second end faces said cap (10), is inserted and held in said receiving means (25) of said cap (10).

3. A suction head according to claim 2, wherein said receiving means (25) of said cap (10) is substantially coaxial with said connector (9).

4. A suction head according to claim 1, wherein said weight member (30) is a cylindrical bolt.

5. A suction head according to claim 1, wherein inlet openings (23) are formed in said base (14) of said housing (7), wherein said inlet openings are also covered by said filter mesh (12), and wherein said inlet openings (23) open out into said interior of said housing (7).

6. A suction head according to claim 1, wherein an insert (19), which serves as an air eliminator, is disposed in said housing (7) substantially coaxial to said weight member (30).

7. A suction head according to claim 1, wherein said base (14) of said housing (7) has a rounded or spherical outer contour (26).

8. A suction head according to claim 1, wherein said receiving means (25) of said cap (10) is substantially coaxial with said connector (9).

9. A suction head for the end of a flexible fuel line (6) in a fuel tank (1) of a portable, manually-guided implement, comprising:

a cup-shaped housing (7) of polymeric material, wherein an outer surface of said housing is provided with cutouts (11);

a filter mesh (12) for covering said cutouts (11);

a cap (10) for closing off said housing (7), wherein said cap is provided with a connector (9) that communicates with an interior of said cap (10) and serves for connection to an end of a fuel line (6), wherein said cap (10) Is provided with a receiving means (25), wherein said receiving means (25) of said cap (10) comprises a plurality of axially extending flanges (27) that are disposed on said cap and in a circumferential direction are spaced from one another; and a rod-shaped weight member (30) disposed in said interior of said housing (7), wherein said weight member essentially extends over the length of said housing (7) from a base (14) thereof to said cap (10), wherein a first end (31) of said weight member (30) is disposed against said base (14) of said housing (7), and wherein a second end (34) of said weight member (30) is disposed against said cap (10), wherein said second end (34) of said weight member (30), which second end faces said cap (10), is inserted and held in said receiving means (25) of said cap (10).

10. A suction head according to claim 9, wherein said first end (31) of said weight member (30), which first end faces said base (14) of said housing (7), is provided with a plate-shaped base (32) that is disposed against said base (14) of said housing (7).

11. A suction head according to claim 10, wherein said base (32) of said weight member (30) is positively disposed against said base (14) of said housing (7).

12. A suction head according to claim 10, wherein said base (32) of said weight member (30) is embedded in polymeric material of said base (14) of said housing (7).

13. A suction head according to claim 9, wherein an inside diameter (D) of said receiving means (25) of said cap (10) is slightly less than a diameter (d) of said facing second end (34) of said weight member (30).

14. A suction head according to claim 9, wherein said cap (10) with said connector (9) and said axially extending flanges (27) of said receiving means (25) is a monolithic component.

15. A suction head according to claim 9, wherein said receiving means (25) of said cap (10) is provided with discharge windows (36) that establish communication between said interior of said housing (7) and said connector (9).

16. A suction head according to claim 9, wherein said weight member (30) is a cylindrical bolt.

17. A suction head according to claim 9, wherein inlet openings (23) are formed in said base (14) of said housing (7), wherein said inlet openings are also covered by said filter mesh (12), and wherein said inlet openings (23) open out into said interior of said housing (7).

18. A suction head according to claim 9, wherein an insert (19), which serves as an air eliminator, is disposed in said housing (7) essentially coaxial to said weight member (30).

19. A suction head according to claim 9, wherein said base (14) of said housing (7) has a rounded or spherical outer contour (26).

* * * * *